US010296354B1

(12) United States Patent
Sanvido et al.

(10) Patent No.: US 10,296,354 B1
(45) Date of Patent: May 21, 2019

(54) OPTIMIZED BOOT OPERATIONS WITHIN A FLASH STORAGE ARRAY

(71) Applicant: PURE Storage, Inc., Mountain View, CA (US)

(72) Inventors: Marco Sanvido, Belmont, CA (US); Richard Hankins, San Jose, CA (US); Mark McAuliffe, East Palo Alto, CA (US); HuiHui Cheng, Fremont, CA (US); Nidhi Doshi, Mountain View, CA (US); Naveen Neelakantam, Mountain View, CA (US); Neil Vachharajani, San Francisco, CA (US)

(73) Assignee: Pure Storage, Inc., Mountain View, CA (US)

( * ) Notice: Subject to any disclaimer, the term of this patent is extended or adjusted under 35 U.S.C. 154(b) by 207 days.

(21) Appl. No.: 14/602,052

(22) Filed: Jan. 21, 2015

(51) Int. Cl.
*G06F 9/00* (2006.01)
*G06F 9/24* (2006.01)
*G06F 9/4401* (2018.01)

(52) U.S. Cl.
CPC .................................. *G06F 9/4408* (2013.01)

(58) Field of Classification Search
CPC ........................................................ G06F 9/44
See application file for complete search history.

(56) References Cited

U.S. PATENT DOCUMENTS

| 4,970,648 A * | 11/1990 | Capots ................ G06F 11/1008 360/5 |
| 5,208,813 A | 5/1993 | Stallmo |
| 5,403,639 A | 4/1995 | Belsan |
| 5,940,838 A | 8/1999 | Schmuck et al. |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Masaaki et al. |

(Continued)

FOREIGN PATENT DOCUMENTS

| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Mohammed H Rehman

(57) ABSTRACT

A system and method for efficiently starting up a plurality of solid-state storage devices. A computing system includes one or more storage devices storing data in multiple allocation units (AUs). In a boot region, a data storage controller maintains an AU management set that identifies a state of various AUs in the system. In various embodiments, the management set includes an identification of a subset of free AUs, transitional AU, unincorporated AUs, and speculative AUs. At various times, information corresponding to the AU management set is stored to non-volatile storage. During a boot sequence, the AU management set information is accessed and the identified AUs are searched to identify allocated AUs rather than performing a search of all of the AUs in the system.

18 Claims, 10 Drawing Sheets

(56) References Cited

U.S. PATENT DOCUMENTS

| | | | |
|---|---|---|---|
| 6,834,298 B1 | 12/2004 | Singer et al. | |
| 6,850,938 B1 | 2/2005 | Sadjadi | |
| 6,915,434 B1 | 7/2005 | Kuroda | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |
| 7,783,682 B1 | 8/2010 | Patterson | |
| 7,873,619 B1 | 1/2011 | Faibish et al. | |
| 7,913,300 B1 | 3/2011 | Flank et al. | |
| 7,933,936 B2 | 4/2011 | Aggarwal et al. | |
| 7,979,613 B2 | 7/2011 | Zohar et al. | |
| 8,086,652 B1 | 12/2011 | Bisson et al. | |
| 8,117,464 B1 | 2/2012 | Kogelnik | |
| 8,205,065 B2 | 6/2012 | Matze | |
| 8,352,540 B2 | 1/2013 | Anglin et al. | |
| 8,527,544 B1 | 9/2013 | Colgrove et al. | |
| 8,560,747 B1 | 10/2013 | Tan et al. | |
| 8,621,241 B1 | 12/2013 | Stephenson | |
| 8,700,875 B1 | 4/2014 | Barron et al. | |
| 8,751,463 B1 | 6/2014 | Chamness | |
| 8,806,160 B2 | 8/2014 | Colgrove et al. | |
| 8,874,850 B1 | 10/2014 | Goodson et al. | |
| 8,959,305 B1 | 2/2015 | Lecrone et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 9,552,248 B2 | 1/2017 | Miller et al. | |
| 10,031,762 B2 * | 7/2018 | Cao | G06F 9/4416 |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2003/0140209 A1 | 7/2003 | Testardi | |
| 2004/0049572 A1 | 3/2004 | Yamamoto et al. | |
| 2005/0066095 A1 | 3/2005 | Mullick et al. | |
| 2005/0216535 A1 | 9/2005 | Saika et al. | |
| 2005/0223154 A1 | 10/2005 | Uemura | |
| 2006/0074940 A1 | 4/2006 | Craft et al. | |
| 2006/0136365 A1 | 6/2006 | Kedem et al. | |
| 2006/0155946 A1 | 7/2006 | Ji | |
| 2007/0067585 A1 | 3/2007 | Ueda et al. | |
| 2007/0162954 A1 | 7/2007 | Pela | |
| 2007/0171562 A1 | 7/2007 | Maejima et al. | |
| 2007/0174673 A1 | 7/2007 | Kawaguchi et al. | |
| 2007/0220313 A1 | 9/2007 | Katsuragi et al. | |
| 2007/0245090 A1 | 10/2007 | King et al. | |
| 2007/0266179 A1 | 11/2007 | Chavan et al. | |
| 2008/0040570 A1 * | 2/2008 | Challenger | G06F 12/023 711/170 |
| 2008/0059699 A1 | 3/2008 | Kubo et al. | |
| 2008/0065852 A1 * | 3/2008 | Moore | G06F 9/4411 711/170 |
| 2008/0134174 A1 | 6/2008 | Sheu et al. | |
| 2008/0155191 A1 | 6/2008 | Anderson et al. | |
| 2008/0178040 A1 | 7/2008 | Kobayashi | |
| 2008/0209096 A1 * | 8/2008 | Lin | G06F 13/387 710/301 |
| 2008/0244205 A1 | 10/2008 | Amano et al. | |
| 2008/0275928 A1 | 11/2008 | Shuster | |
| 2008/0285083 A1 | 11/2008 | Aonuma | |
| 2008/0307270 A1 | 12/2008 | Li | |
| 2009/0006587 A1 * | 1/2009 | Richter | H04L 29/12009 709/220 |
| 2009/0037662 A1 | 2/2009 | La Frese et al. | |
| 2009/0204858 A1 | 8/2009 | Kawaba | |
| 2009/0228648 A1 | 9/2009 | Wack | |
| 2009/0300084 A1 | 12/2009 | Whitehouse | |
| 2010/0057673 A1 | 3/2010 | Savov | |
| 2010/0058026 A1 | 3/2010 | Heil et al. | |
| 2010/0067706 A1 | 3/2010 | Anan et al. | |
| 2010/0077205 A1 | 3/2010 | Ekstrom et al. | |
| 2010/0082879 A1 | 4/2010 | McKean et al. | |
| 2010/0106905 A1 | 4/2010 | Kurashige et al. | |
| 2010/0153620 A1 | 6/2010 | McKean et al. | |
| 2010/0153641 A1 | 6/2010 | Jagadish et al. | |
| 2010/0191897 A1 * | 7/2010 | Zhang | G06F 12/0246 711/103 |
| 2010/0250802 A1 | 9/2010 | Waugh et al. | |
| 2010/0250882 A1 | 9/2010 | Hutchison et al. | |
| 2010/0281225 A1 * | 11/2010 | Chen | G06F 9/544 711/147 |
| 2010/0287327 A1 | 11/2010 | Li et al. | |
| 2011/0072300 A1 | 3/2011 | Rousseau | |
| 2011/0145598 A1 | 6/2011 | Smith et al. | |
| 2011/0161559 A1 | 6/2011 | Yurzola et al. | |
| 2011/0167221 A1 | 7/2011 | Pangal et al. | |
| 2011/0238634 A1 | 9/2011 | Kobara | |
| 2012/0023375 A1 | 1/2012 | Dutta et al. | |
| 2012/0036309 A1 | 2/2012 | Dillow et al. | |
| 2012/0117029 A1 | 5/2012 | Gold | |
| 2012/0198175 A1 | 8/2012 | Atkisson | |
| 2012/0260101 A1 * | 10/2012 | Hunt | G06F 12/1408 713/189 |
| 2012/0330954 A1 | 12/2012 | Sivasubramanian et al. | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 * | 8/2013 | Kettner | H03M 7/6064 711/170 |
| 2013/0227236 A1 | 8/2013 | Flynn et al. | |
| 2013/0275391 A1 | 10/2013 | Batwara et al. | |
| 2013/0275656 A1 | 10/2013 | Talagala et al. | |
| 2013/0283058 A1 | 10/2013 | Fiske et al. | |
| 2013/0290648 A1 | 10/2013 | Shao et al. | |
| 2013/0318314 A1 | 11/2013 | Markus et al. | |
| 2013/0339303 A1 | 12/2013 | Potter et al. | |
| 2014/0052946 A1 | 2/2014 | Kimmel | |
| 2014/0068791 A1 | 3/2014 | Resch | |
| 2014/0089730 A1 | 3/2014 | Watanabe et al. | |
| 2014/0101361 A1 | 4/2014 | Gschwind | |
| 2014/0143517 A1 | 5/2014 | Jin et al. | |
| 2014/0172929 A1 | 6/2014 | Sedayao et al. | |
| 2014/0201150 A1 | 7/2014 | Kumarasamy et al. | |
| 2014/0215129 A1 | 7/2014 | Kuzmin et al. | |
| 2014/0229131 A1 | 8/2014 | Cohen et al. | |
| 2014/0229452 A1 | 8/2014 | Serita et al. | |
| 2014/0281308 A1 | 9/2014 | Lango et al. | |
| 2014/0325115 A1 | 10/2014 | Ramsundar et al. | |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0019114 A1 | 1/2016 | Han et al. | |
| 2016/0098191 A1 | 4/2016 | Golden et al. | |
| 2016/0098199 A1 | 4/2016 | Golden et al. | |

FOREIGN PATENT DOCUMENTS

| | | | |
|---|---|---|---|
| CN | 104025010 B | 11/2016 | |
| EP | 3066610 A1 | 9/2016 | |
| EP | 3082047 A1 | 10/2016 | |
| EP | 3120235 A | 1/2017 | |
| JP | 2007-087036 A | 4/2007 | |
| JP | 2007-094472 A | 4/2007 | |
| JP | 2008-250667 A | 10/2008 | |
| JP | 2010-211681 A | 9/2010 | |
| WO | WO-1995/002349 A1 | 1/1995 | |
| WO | WO-1999/013403 A1 | 3/1999 | |
| WO | WO-2008/102347 A1 | 8/2008 | |
| WO | WO-2010/071655 A1 | 6/2010 | |

OTHER PUBLICATIONS

Microsoft Corporation, "Fundamentals of Garbage Collection", Retrieved Aug. 30, 2013 via the WayBack Machine, 11 pages.

* cited by examiner

OPTIMIZED BOOT OPERATIONS WITHIN A FLASH STORAGE ARRAY

BACKGROUND OF THE INVENTION

Field of the Invention

This invention relates to computer networks and, more particularly, to efficiently boot and management of a storage system.

Description of the Related Art

As computer memory storage and data bandwidth increase, so does the amount and complexity of data that businesses daily manage. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired.

Software applications, such as a logical volume manager or a disk array manager, provide a means of allocating space on mass-storage arrays. In addition, this software allows a system administrator to create units of storage groups including logical volumes. There may be a significantly large number of volumes, each including an appreciable amount of allocation units (AUs).

A reboot of a storage system may occur for a variety of reasons. For example, a system administrator may request a reboot, a reboot may automatically occur during recovery from a power outage, a failover process may detect a first data storage controller fails and selects a second data storage controller to manage the storage subsystem. Whatever the reason, the boot sequence may consume an appreciable amount of time. One issue that must be managed is determining which of the AUs within the storage system are unallocated and available for use. Typically, identifying which AUs are in use and which are free includes a process of scanning the entire storage subsystem. As the number of AUs in the storage subsystem can be quite large, the scan process can introduce a significant delay in the reboot process. These delays in turn reduce system performance and/or may cause errors of other systems using the data.

In view of the above, systems and methods for efficiently starting up a plurality of solid-state storage devices after storage operation are desired.

SUMMARY OF THE INVENTION

Various embodiments of a computer system and methods for efficiently starting up a plurality of solid-state storage devices after storage operation are disclosed.

In various embodiments, a computing system is contemplated that includes one or more storage devices configured to store data in multiple allocation units (AUs). The data storage controller maintains an identification if AUs in the system that are available for allocation. Such an identification may be in the form of a "free list", table, tree(s), or any other suitable data structure. Responsive to a request to allocate storage, the data storage controller selects an available AU for allocation. Additionally, in various embodiments, the storage controller is configured to maintain a subset (or "free sublist") of AUs that are available for allocation. This subset represents less than all available AUs. In response to a request for an AU, an AU is selected from this subset. At various times, the storage controller stores an identification of the subset of AUs in the free sublist to persistent storage. There may be times when the identification of the subset of AUs that is persisted is not up to date with the AUs actually available for allocation in the system. In various embodiments, the persistent storage location corresponds to a boot region. In addition, the controller maintains a database that identifies AUs currently allocated within the system. This database further provides an identifier associated with allocated AUs that indicates when the AU was allocated relative to other allocated AUs. This database is updated in persistent storage at various times and may not always represent an up to date indication of AUs currently allocated within the system.

In various embodiments, during a boot sequence the previously persisted free sublist is accessed in the boot region to identify a subset of free AUs on the storage devices. In addition, the persisted database is accessed to determine a most recently allocated AU as identified by the database. Each AU identified by the free sublist is then accessed to determine whether it is in fact available or allocated. If one of these AUs is allocated, an identifier associated with the allocated AU is obtained and compared to the most recently allocated AU identified by the database. If the AU was allocated after the indication by the database, then the database is updated to reflect this information. After completing review of the AUs in the free sublist and updating the database, a comparison of all AU (allocated or free) in the system is compared to those identified as allocated by the database. The difference based on the comparison provides an indication of all free AUs in the system and processing may proceed.

In some embodiments, the free sublist represents only a portion of a larger AU management set that is maintained. In such embodiments, the AU management set identifies a subset of free AUs, AUs that have been selected for allocation but are not yet in use, and AUs that are currently allocated but whose identification has not yet been persisted to non-volatile storage. During a boot sequence, AUs identified by the AU management set are scanned to identify allocated AUs. Based on the scan, the allocated and unallocated AUs are identified and a new AU management set created for use in processing.

These and other embodiments will become apparent upon consideration of the following description and accompanying drawings.

Figure 1:
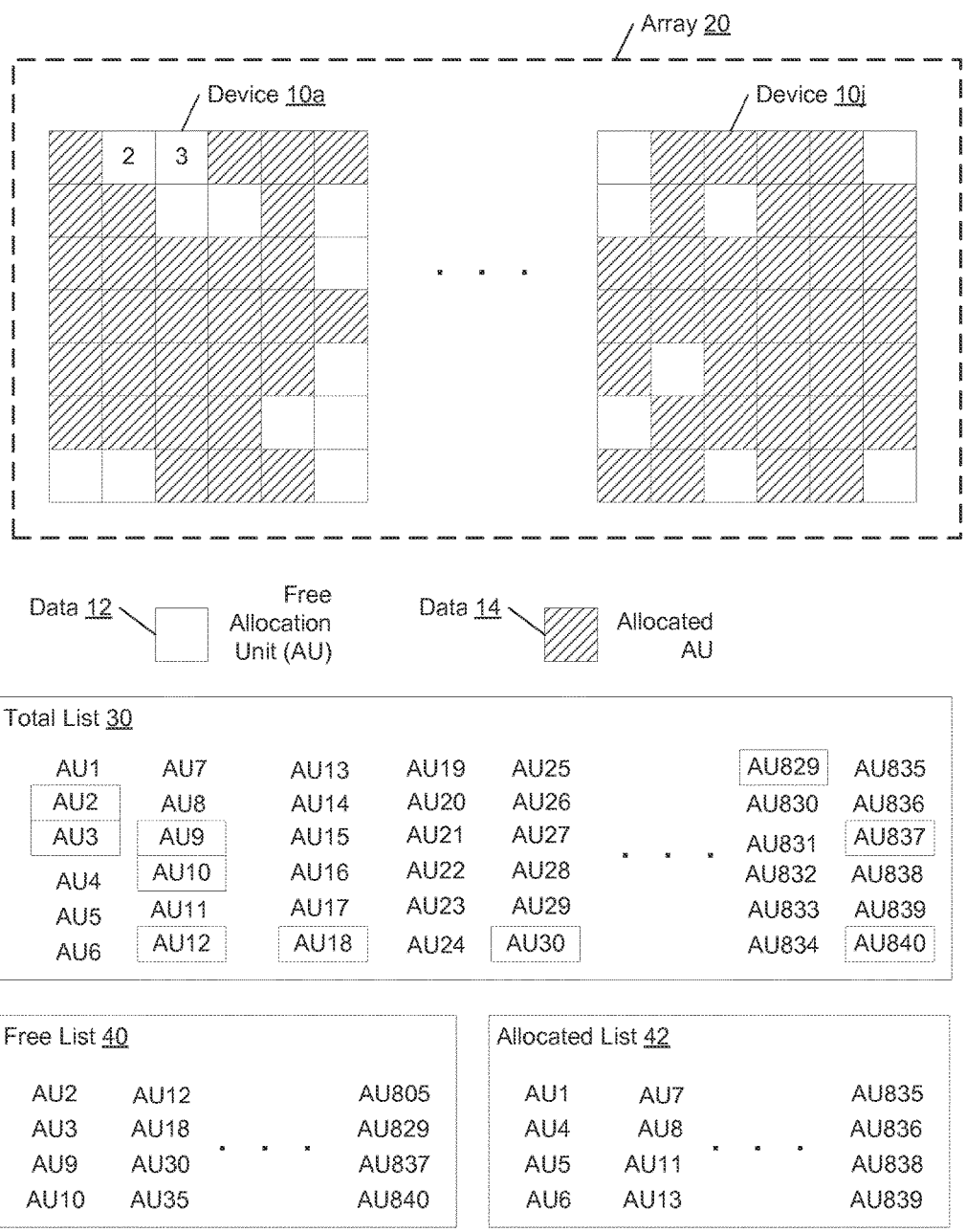
FIG. 1 is a generalized block diagram illustrating one embodiment of maintaining allocation status in a storage subsystem.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of maintaining allocation status in a storage subsystem is shown. While any type of storage system is contemplated, redundant arrays of inexpensive/independent disks (RAID) based or otherwise, a RAID based system is depicted for purposes of discussion. In the example shown, an array 20 is depicted that includes multiple devices 10a-10j configured to store data. As used herein, reference numerals followed by a letter or other designation may be referred to by the reference number alone for ease of discussion. For example, devices 10a-10j may simply be referred to as devices 10. Each of the blocks within the devices 10 illustrates an allocation unit. In various embodiments, each of the allocation units has a same size. In other embodiments, the allocation units have varying size based on factors such as the device, the type of data to store, the amount of data to store from a received request, the amount of data to store from a received request after deduplication, and so forth.

When identified as being allocated for data storage, a given allocated unit (AU) is not currently available for allocation. A given allocated unit may store valid data as shown by data 14. Alternatively, an allocated AU may not store valid data but may not yet be identified as being free for allocation. Stored data may be user data, inter-device RAID (redundant arrays of inexpensive/independent disks) information, log information, intra-device protection data, metadata for one or more other allocation units, and so forth. In the example shown, free allocation units are identified as such by the pattern Data 12 (blank). Allocated units are identified with the pattern Data 14. In some embodiments, data may be stored in the devices 10 in a random access manner. In other embodiments, data may be stored in a particular manner as desired by a given algorithm. All such embodiments are contemplated.

In various embodiments, each of the allocation units may have an associated unique allocation unit identifier (AU ID). In various embodiments, such identifiers may be unique to a given device, a given array, a given logical storage unit, or otherwise. In some embodiments, the AU ID is unique within a given device of the devices 20a-20j and a device ID is combined with the AU ID to provide a unique identifier for the array 20. In the example shown in FIG. 1, only the AU IDs are used as unique identifiers for ease of illustration. In the embodiment shown, the total list 30 identifies all AUs in the system. For example, an AU ID for each of the allocation units in the devices 10 may be identified. The AU IDs that are boxed in the total list 30 indicate AUs currently available for allocation (i.e., free AUs). For example, the top row of device 10a has 2 free AUs. For purposes of discussion, if the top row of device 10a has assigned AU IDs 1 to 6 from left to right, the free AUs are AU ID 2 and AU ID 3. These AU IDs are boxed in the total list 30. Although the AU IDs are assigned sequentially in this example, other assignments and methods for assigning the AU IDs are possible and contemplated. In addition, the AU IDs may start over with an initial value within each one of the devices 10. Therefore, as described earlier, a corresponding device ID may be included with the AU IDs in order to create unique identifiers. It is noted that the total list 30 is merely a logical representation of AUs in the system. It is not necessarily that case that there is a list of all AUs, as such, per so. Those skilled in the art will appreciate that identification of AUs in the system may take many forms, and may be determined by reference to multiple tables, data structures, or otherwise.

In FIG. 1, the free list 40 identifies all AUs available for allocation. In this example, AU IDs identifying unallocated (free) AUs are identified by the free list 40. As can be seen, each of the free (boxed) AU IDs in the total list 30 is included in the free list 40. For example, the free list 40 is shown to include at least AU IDs 2, 3, 9, 10, 12, 18, 30, 35, 805, 829, 837 and 840. The Allocated list 42 includes AU IDs identifying allocated AUs. Each of the allocated (unboxed) AU IDs in the total list 30 is included in the Allocated list 42. For example, the free list 40 is shown to include at least AU IDs 1, 4-8, 11, 13, 835, 836, 838 and 839. A data storage controller (not shown) may maintain each of the free list 40 and the Allocated list 42 as operations are processed in the storage subsystem. It is noted that the total list 30, free list 40, and allocated list 42 are logical representations of AUs in the system. It is not necessarily the case that there are lists of AUs, per se. Those skilled in the art will appreciate that identification of AUs in the system may take many forms, and may be determined by reference to multiple tables, data structures, or otherwise. In some embodiments, one or more of the lists 30, 40, 42 is completely accurate. In other embodiments, there may be some margin of error. For example, the total list 30 could identify AUs that are failed or otherwise not usable. Similarly, during operation, one or more of the lists may temporarily be out of sync with a status of the AUs due to a latency associated with updating a list, otherwise. Whichever the case, it may generally be a goal to keep these lists as close to up to date and accurate as possible during normal operation.

A variety of operations within the system may cause an AU to be allocated or unallocated. For example, a given AU may be allocated responsive to the processing of a write request, responsive to garbage collection processes, or other processes that require allocation of storage. In some cases, the data to be stored includes user data to store on one or more of the devices 10. Alternatively, the data may include inter-device RAID information, log information, intra-device protection data, metadata for one or more other allocation units, and so forth. Processes requiring allocation of AUs may be generated by a client computer, a data storage controller (not shown) performing a deduplication operation, garbage collection operations, defragmentation operations, etc. For example, a deduplication operation may determine that user data received as part of a write request does not need to be stored as a copy already exists. However, a deduplication mapping table may be updated which does cause allocation of storage. These and other scenario are possible and are contemplated.

In various embodiments, state transitions of a given AU from free to allocated, and vice-versa, may not be immediately reflected in persistent storage. Rather, an in-memory representation may reflect changes to one or more AUs that have not been stored to persistent storage. For example, in one embodiment, a database is maintained in persistent storage that identifies allocation units currently in use in the storage system. In effect, this database may be seen to identify where valid data is currently stored in the storage system. The identification of AUs currently allocated may take many forms and various tables or other data structure may be used for storing such data. In various embodiments, the database may further identify when a given AU was allocated relative to other AUs. Deallocation of AUs may likewise be reflected in the database. For example, in one embodiment the allocation of an AU may be associated with a time stamp. In other embodiments, other types of identifiers are used to indicate an ordering. For example, in one embodiment, a strictly increasing identifier (e.g., each successive identifier is incremented) is used to determine whether an AU was allocated after another. Various such approaches are possible and are contemplated. Additionally, in various embodiments allocated AUs in the storage system may themselves store such an identifier and or otherwise be associated with such an identifier. In this manner, reading data stored within a given AU (e.g., as part of a header or user data itself) may provide an indication as to whether the AU is currently allocated and when the AU was allocated vis-à-vis another AU.

It is noted that the example shown in FIG. 1 is small for illustrative purposes. In some examples, a data storage controller supports hundreds of thousands of volumes, each volume includes hundreds of thousands of allocation units. The total number of AUs in the data storage subsystem may reach tens of millions. In response to a reboot of the system, determining which AUs are currently allocated in the system and which are not may require reading each AU in the system to determine whether it is currently allocated. Consequently, the reboot process may be relatively time consuming. Delays caused by such a process may be unacceptable (or at least undesirable) for critical applications in business, medicine, entertainment and so forth.

Figure 2:
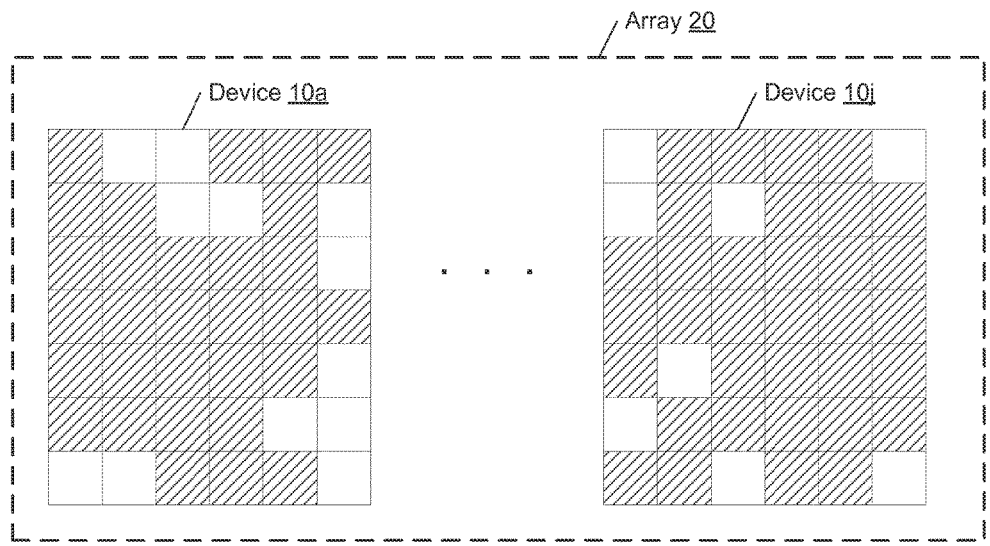
FIG. 2 is a generalized block diagram illustrating one embodiment of maintaining pre-scan data in a storage subsystem.
Figure 2:
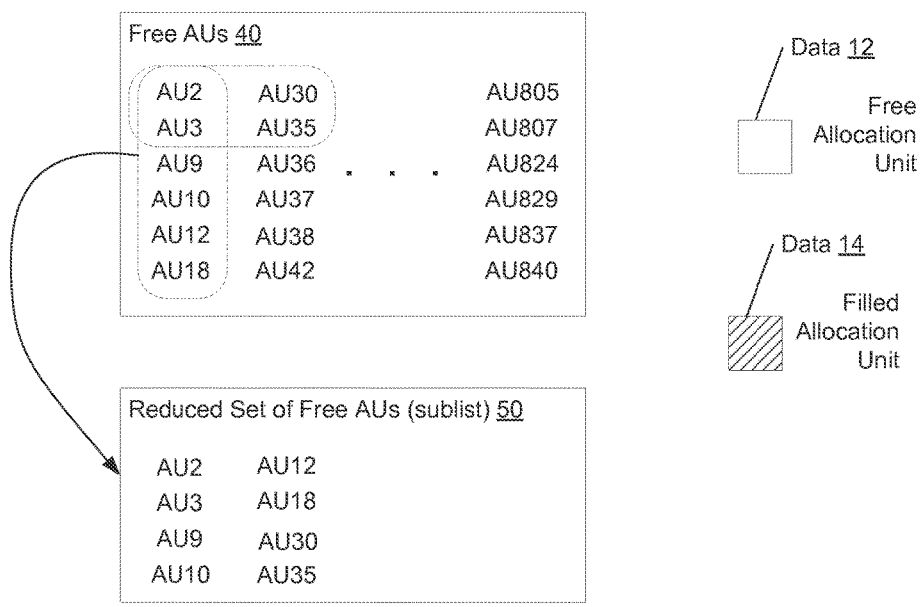

Turning to FIG. 2, improved methods and mechanisms are discussed that may generally reduce the boot time for a storage system. FIG. 1 illustrates a generalized block diagram of one embodiment of a system configured to maintain data in a storage subsystem. As in FIG. 1, an array 20 with devices 10 is shown. Also shown is the free list 40. In addition to these, a subset of the free list 40, free sublist 50 is maintained. For example, the free sublist 50 stores information identifying a subset of the free AUs identified by the free list 40. As an example, the free list 40 may store information identifying tens of millions of AUs. The free sublist 50 may store information identifying hundreds of thousands of AUs, or some other fraction of the information in the free list 40. For illustrative purposes, the free sublist 50 includes a subset of the AU IDs in the free list 40 identifying unallocated (free) AUs. For example, the free sublist 50 is shown to include at least AU IDs 2, 3, 9, 10, 12, 18, 30 and 35. A data storage controller and/or some other controller (not shown here) may maintain one or more of each of the free list 40, free sublist 50 as operations are processed in the storage subsystem.

The selection of AUs identified by the free sublist 50 may be performed in any of a variety of ways. For example, if a data structure used for the free list 40 that is amenable to ordering AU IDs is used then a range of AU IDs from the free list 40 may be used. For example, in an ordered tree structure, a portion of the tree could be used. In other embodiments, AUs may be selected based upon other criteria, such as frequency of use, how recently used, number of errors detected, location, and so on. These and other approaches are possible and contemplated.

In various embodiments, when an AU is to be allocated within the system, the AU is selected from the free sublist 50—rather than the free list 40 as a whole. As noted above, allocation of an AU may be associated with a particular ID that is usable to indicate it was allocated before and/or after other AUs that have been allocated. Such an indication could be a strictly increasing identifier, time stamp, or otherwise. This identifier is then stored in association with the allocated AU (e.g., in a header associated with the AU or otherwise). When an AU is allocated, the AU is chosen from the free sublist 50 and that AU is now removed from the free sublist 50. Removal of the AU from the free sublist 50 may include actually removing an identification of the AU from the free sublist 50 or otherwise providing an indication in the free sublist 50 that it is no longer available for allocation. As noted above, some indication of AUs that have been allocated may be stored to persistent storage in a database of otherwise (e.g., on one or more of the devices 10 or elsewhere). However, storing this indication may not generally occur upon each allocation. Rather, storing such indications to persistent storage may occur on a periodic basis, at times of relatively low system load, time of day, or at some other time that may be determined programmatically, dynamically based on system or other conditions, or a combination of the two.

Additionally, in various embodiments, when a new sublist 50 is created, an identification of AUs in the sublist 50 may be stored to persistent storage before AUs may be allocated. For example, at system start an identification of all free AUs 40 may be determined. Based on this, the sublist 50 may be created and an identification of AU in the sublist 50 stored to persistent storage before AUs are allocated from the free sublist 50. During operation, at various times, a current state of the free sublist 50 is stored to persistent storage. Such times may be on a periodic basis, at times of relatively low system load, or at some other time that may be determined programmatically, dynamically based on system or other conditions, or a combination of the two. In various embodiments, when the free sublist 50 reaches a particular size (e.g., there only remain a given number of AUs available for allocation in the free sublist 50), it may be replenished with new AUs from the free list 40. In other embodiments, replenishment may be chosen on that basis of an opportune time. For example, when the system is idle or otherwise experiencing a low load, replenishment of the free sublist 50 may be performed. These and other embodiments are possible and are contemplated. When the free sublist 40 is replenished to include new AUs not previously included in the free sublist 50, an identification of AUs in the free sublist 50 may be stored in persistent storage before allocating AUs from the newly replenished free sublist 50. In some embodiments, the processing of write requests and other processes requiring allocation of an AU may be delayed while the free sublist 50 is being replenished. After it is replenished and an identification of the AUs identified by the newly replenished free sublist 50 are stored to persistent storage, the processes may resume.

In various embodiments, the free sublist 50, or some other identification of AUs included in the free sublist 50, may be stored in a location accessible during a boot process. For example, in one embodiment, a boot region of a storage device may be used. Similarly, data associated with the above described database that identifies allocated AUs in the system may be stored in such a location. During a boot process, this free sublist related data and database related data are used to speed the boot process as described below.

Figure 3:
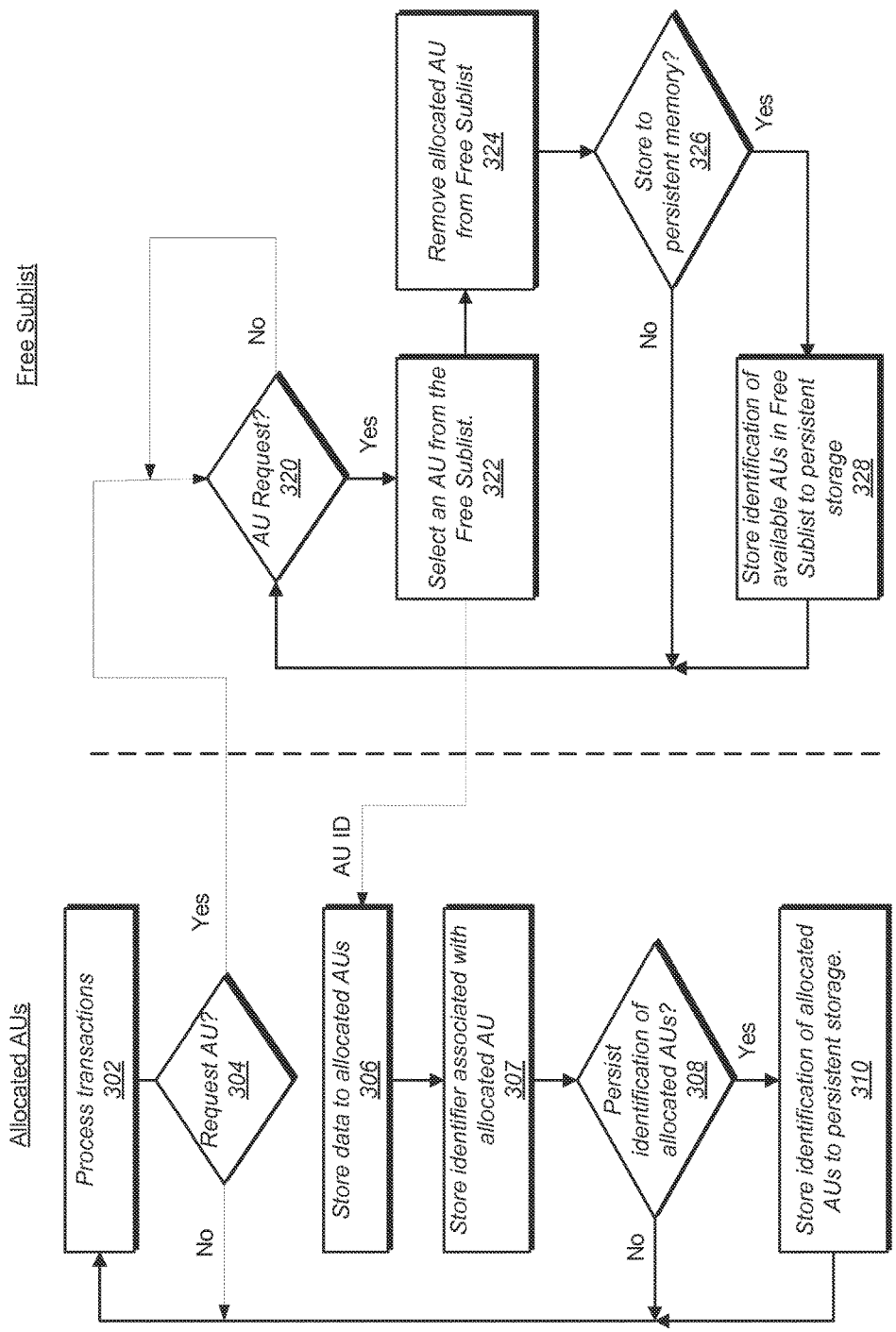
FIG. 3 is a generalized flow diagram illustrating one embodiment of a method for processing transactions with an Allocated list and a free sublist.

Turning now to FIG. 3, a generalized flow diagram of one embodiment of a method for maintaining allocation unit related information in a storage system is shown. For purposes of discussion, the steps in this embodiment are shown in sequential order. However, some steps may occur in a different order than shown, some steps may be performed concurrently, some steps may be combined with other steps, and some steps may be absent in another embodiment.

An overview of two processes are depicted in FIG. 3, Allocated AUs and Free Sublist. In various embodiments, these processes may occur simultaneously during system operation. In some embodiments, the processes are largely independent. In other embodiments, an event in one process may trigger an event in the other. Various such embodiments are possible and are contemplated. The first process depicted, Allocated AUs, generally illustrates handling of requests for allocation of AUs and persisting an identification of allocated AUs to persistent storage. The second process depicted, Free Sublist, generally illustrates allocation of AUs from a free sublist.

In block 302, transactions targeting the data storage subsystem are processed. Such transactions may be externally generated or internally generated. For example, I/O transactions from a client or other device may be received that target the storage system. Alternatively, transactions may be internally generated responsive to administrative or maintenance tasks such as garbage collection, replication, deduplication, or otherwise. Responsive to such transactions, if there is no request for allocation of an AU (block 304), then processing may simply continue (block 302). However, a request for allocation of an AU may be generated (block 304). In various embodiments, the request is detected (block 320) by a process associated with the Free Sublist. In response, an AU is selected from the Free Sublist (block 322) and provided to a process associated with the requestor.

In block 306, the data is stored in the allocated AU(s). Additionally, an identification of the allocated AU is maintained (e.g., in volatile memory) (block 307).

If an event or a condition is satisfied for persisting the Allocated list (conditional block 308), then in block 310, the updated copy of the Allocated list is stored in persistent memory. Subsequently, control flow returns to block 302 for processing more transactions. Subsequently, a determination may be made as to whether an identification of allocated AUs is to be persisted (i.e., stored to non-volatile storage) (block 308). If not, then processing may simply resume (block 302). However, if it is determined that an identification of allocated AUs is to be persisted, then such an identification is stored to persistent storage (block 310). In various embodiments, the identification is stored to a database such as is discussed above. As already noted, the decision to persist (block 308) be based on any of a number of factors. For example, persisting may be performed periodically. The periodic time may be a programmable value stored in a configuration register. Alternatively, an idle time of the computing system is detected, a number of AUs to update in the Allocated list reaches a threshold, whereas the threshold may be programmable. Other events and conditions for qualifying the updated copy of the Allocated list to persistent memory are possible and contemplated.

In parallel with the Allocated AUs process, the free sublist is maintained. As shown, if a request for allocation of an AU is detected (block 320), then in block 322 an AU is selected from the free sublist and provided to a process associated with the requestor. In block 324, the selected AU is removed from the free lists or otherwise marked as no longer available for allocation. For example, a copy of the free sublist may be maintained in a RAM or other volatile memory and the selected AU has a state transition from free to allocate within the copy.

If an event or a condition is satisfied for persisting the free sublist (conditional block 326), then in block 328, the updated copy of the free sublist is stored in persistent memory. In some embodiments, the updated copy of the free sublist (or other information indicating which AUs are available in the free sublist) is sent to persistent storage when a periodic time duration is met. The periodic time may be a programmable value and the periodic time may differ from a similar value used for the Allocated list. Alternatively, an idle time of the computing system is detected and the updated copy of the free sublist is sent to persistent storage. Another condition may be a number of AUs to update in the free sublist reaches a threshold, whereas the threshold may be programmable. Other events and conditions for qualifying the updated copy of the Allocated list to persistent memory are possible and contemplated. If the information is not to be persisted (block 326), then processing may return to block 320.

Figure 4:
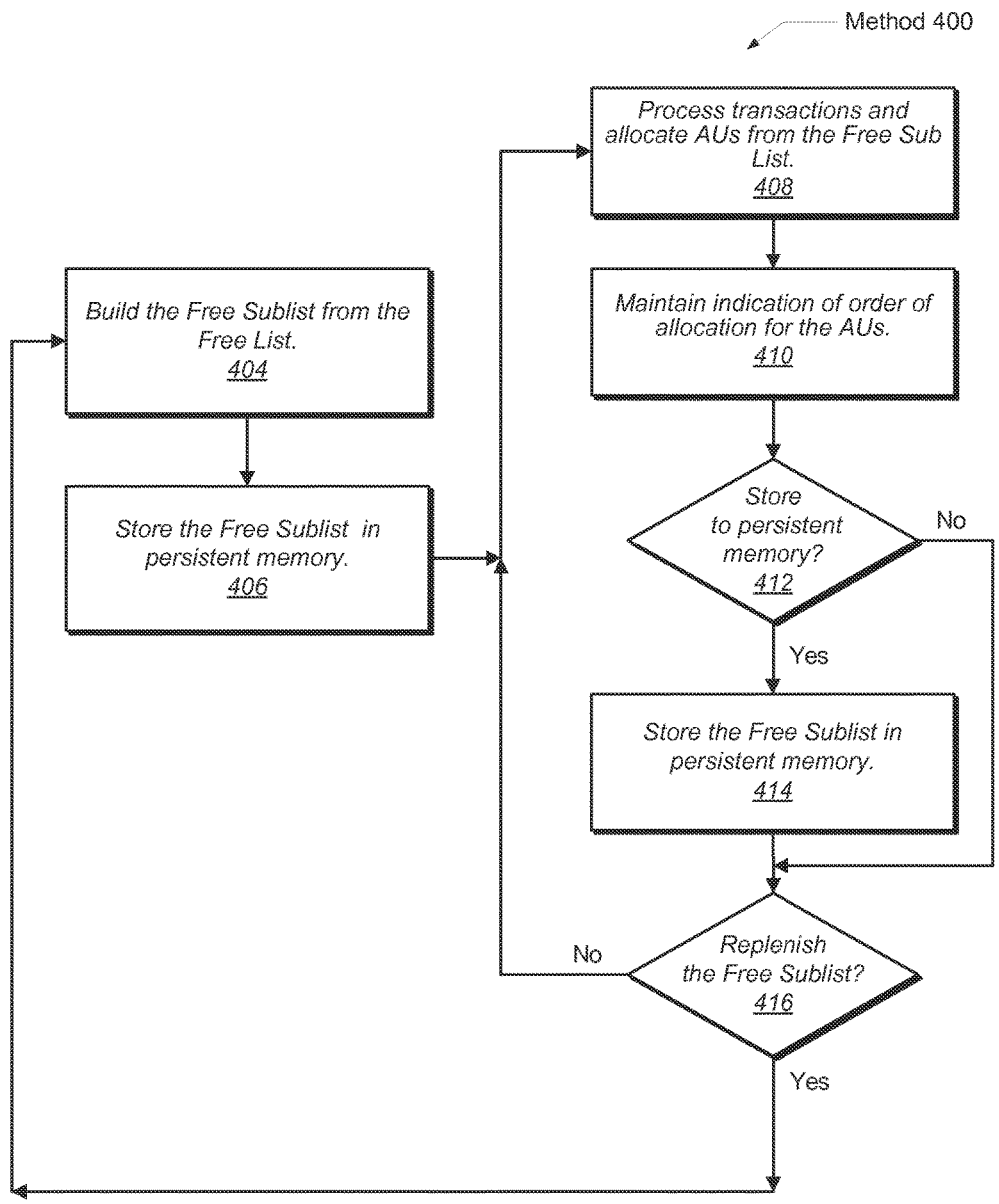
FIG. 4 is a generalized flow diagram illustrating one embodiment of a method for efficiently maintaining pre-scan data in a storage subsystem.

Turning now to FIG. 4, a generalized flow diagram of one embodiment of a method 400 for maintaining a free sublist in a storage system is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 404, a free sublist is built from a free list that generally identifies all AUs available for allocation in the system. In various embodiments, the free list may identify millions of AUs, while the free sublist is selected to only include a fraction of these AUs. Selection of which AUs to include in the free sublist may be performed in any of a variety of ways. For example, if a data structure used for the free list 40 that is amenable to ordering AU IDs is used then a range of AU IDs from the free list 40 may be used. For example, in an ordered tree structure a portion of the tree could be used. In other embodiments, AUs may be selected based upon other criteria, such as frequency of use, how recently used, number of errors detected, location, and so on. These and other approaches are possible and contemplated.

In various embodiments, selection of AUs to be allocated are taken from the free sublist and not the larger free list. In various embodiments, allocation of AUs may not be performed until the free sublist has been created. Still further, in some embodiments allocation of AUs from the free sublist may not be performed until an identification of AUs in the free sublist has been persisted by storing the identification to persistent storage (block 406). In block 408, transactions are processed as described earlier, wherein various operations may generate the transactions. The free sublist is accessed to determine which AUs to allocate for the transactions.

In block 410, as transactions that allocate AUs are processed, an indication as to an order in which AUs are allocated is maintained. In some embodiments, a corresponding time stamp may be maintained for each transaction. In other embodiments, a respective monotonically increasing sequence number is assigned to transactions that allocate AUs. The time stamp or sequence number may be stored with an indication that a corresponding AU is allocated. For example, in some embodiments, the time stamp or sequence number may be stored with the indication in a header of the corresponding AU. Alternatively, the time-order information and the indication of being allocated are stored in a table or a device header. Other locations for storing the time-order information and the allocation indication are possible.

As described earlier for block 326 in FIG. 3, multiple events or conditions may be used for determining when to persistently store the free sublist information. If an event or a condition is satisfied for persisting the free sublist (conditional block 412), then in block 414, the updated copy of the free sublist is stored in persistent memory (or simply information related to the free sublist that identifies AUs). In addition, at various times the free sublist is also replenished responsive to particular events occur or particular conditions being met. For example, the free sublist may be replenished responsive to detecting the free sublist is empty of available (free) AUs. The free sublist may be replenished responsive to the number of AU IDs of remaining free AUs in the free sublist falling below a threshold. Such a threshold may be a programmable value. In various embodiments, the threshold may be a percentage of a newly built free sublist, a number of free AUs used during an effective boot sequence or other startup processing. Other values for the threshold are possible and contemplated. Further, replenishment may occur based on a rate of AUs being allocated during the processing of transactions, a detected idle time, or otherwise. If an event or a condition is satisfied for replenishing the free sublist (conditional block 416), then control flow of method 400 returns to block 404. Otherwise, control flow of method 400 returns to block 408.

Figure 5:
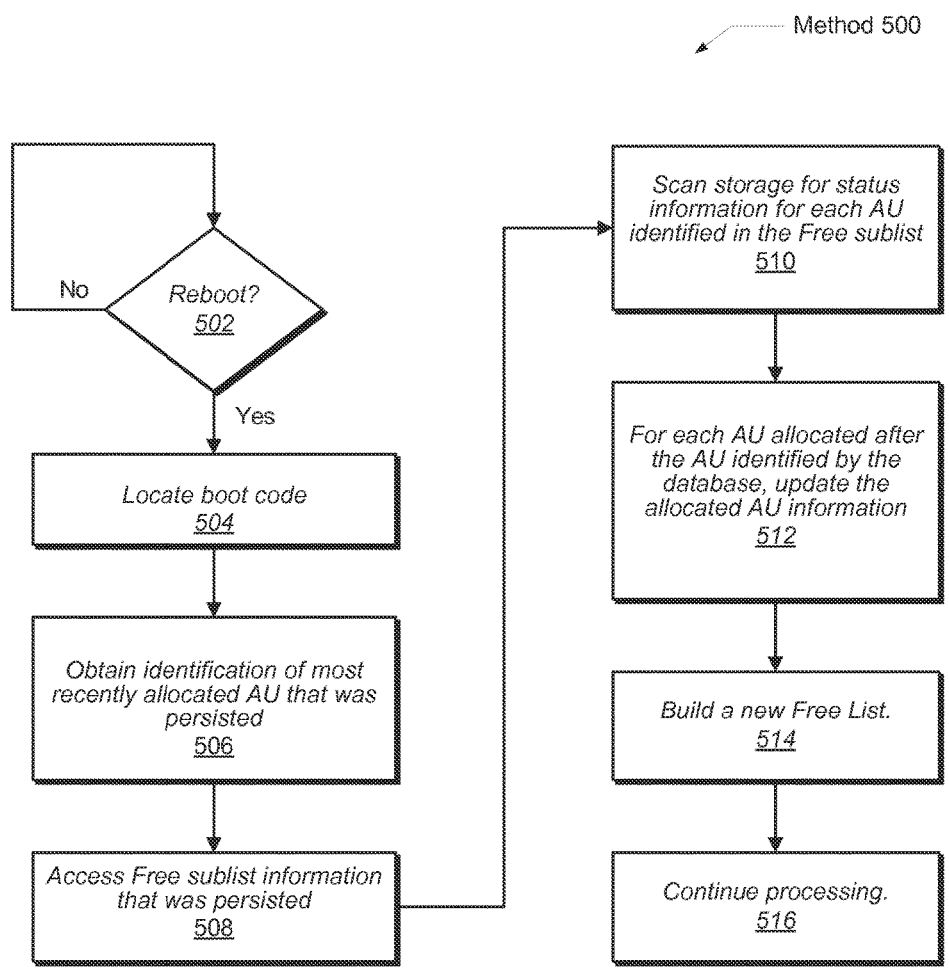
FIG. 5 is a generalized flow diagram illustrating one embodiment of a method for efficiently booting up a storage subsystem.

Turning now to FIG. 5, a generalized flow diagram of one embodiment of a method 500 for efficiently booting up a storage subsystem is shown. For purposes of discussion, the steps in this embodiment are shown in sequential order. However, some steps may occur in a different order than shown, some steps may be performed concurrently, some steps may be combined with other steps, and some steps may be absent in another embodiment.

Responsive to a reboot (conditional block 502), in block 504 boot related code may be located and accessed. For example, a designated boot location may be accessed. In various embodiments, multiple locations may be accessed based on a priority. For example, boot related code and/or circuitry may follow a priority list of locations to search for a boot region. The boot region may include machine code to be loaded by the firmware into RAM. The machine code may be a first phase of boot code that also locates a larger second phase of boot code to be later loaded. Numerous such embodiments are possible and are contemplated.

In block 506, an identification of a most recently allocated AU is retrieved. In various embodiments, the database discussed above is accessed to obtain such information. As already described, the identifier may be a time stamp, a sequence number, or any other identifying data that can be used to determine if an AU was allocated after another AU. In addition, information related to the free sublist that was persisted is retrieved from storage (508). As discussed above, when a free sublist is created an identification of AUs in the free sublist may be persisted. Additionally, an identification of available AUs in the free sublist could be persisted at other times. Having obtained this free sublist information regarding AUs available for allocation, each AU identified by the information may be accessed in the storage system to determine whether or not it is in fact free. It is noted that in an embodiment where AUs are only allocable from the free sublist, any AU that might be allocated in the system that isn't identified by the information obtained in block 506 must be an AU identified in the free sublist information obtained in block 508. Therefore, by determining which of the AUs identified by the persisted free sublist information are actually allocated, we may determine all allocated AUs in the system.

Therefore, a scan of each AU identified by the free sublist information obtained in block 506. As described above, state information associated with each AU may indicate whether or not it is allocated. Such information may be stored in the header of the AU, a user data area of the AU, or a combination of the two. Alternatively, the state information may be stored in a device header or another table within another AU. In addition, for allocated AUs the information includes an indication usable to determine whether the AU was allocated after another allocated AU (e.g., time stamp, sequence number, or otherwise as previously discussed).

By comparing an indication as to when an AU was allocated to the most recently allocated AU identified by the database in block 506, it can be determined that the AU represents an allocated AU not reflected by the database. In other words, an AU was allocated within the system whose identification was not persisted to the database. For each AU identified in the free sublist and determined to be allocated after the AU identified in block 506, information corresponding to the AU may be used to update the information regarding allocated AUs in the system. For example, the database may be updated.

Subsequent to identifying allocated AUs in the system (e.g., by updating the database), in block 514 list of free AUs in the system may be determined. This may be determined by comparing all allocated AUs identified by the database to AUs in the system. The difference between these represents AUs that are not allocated. Having identified unallocated AUs in the system (Free List), a new free sublist may be created as discussed above and used for allocation of AUs. In block 516, the remainder of the reboot process continues prior to further processing of transactions.

Figure 6:
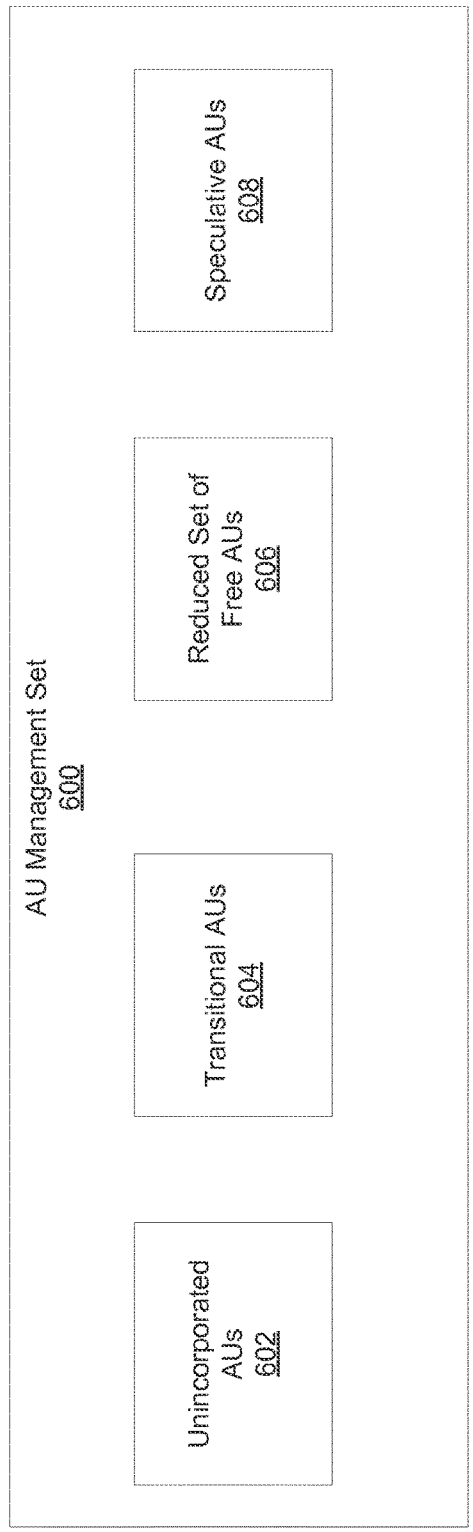
FIG. 6 illustrates one embodiment of AUs that may be tracked within a system.

In the discussion above, allocation units are described as generally being in one of two states—allocated or free. In the above described embodiments, a free sublist was tracked and persisted at various times. In such embodiments, the free sublist is the AU management set as described below. However, in various embodiments, AUs may exist in other states as well. FIG. 6 depicts one embodiment in of an AU management set 600 that tracks various AUs in a system. In the example shown, a reduced set of free AUs 606 is shown which generally corresponds to the above described free sublist. However, in addition to these, various embodiments may also include one or more of unincorporated AUs 602, transitional AUs 604, and speculative AUs 608.

Generally speaking, unincorporated AUs 602 represent AUs within the storage system that have been allocated and are currently in use. However, information indicating that these unincorporated AUs 602 have been allocated and are in use has not yet been persisted. Transitional AUs 604 generally correspond to AUs that are in the process of being allocated for use but are not yet in use. For example, when an AU is selected for allocation from a free list, that AU may be (effectively) marked in some way as no longer being free. However between the time the AU is marked as not being free and the time it actually is in use storing data, the AU is considered to be transitional (it is in a transition period in which it is no longer free for allocation, but is not yet in active use). In addition to unincorporated AUs 602 and transitional AUs 604, in some embodiments an identification of speculative AUs 608 may also be maintained. Speculative AUs 608 generally represent AUs that are currently in use but are believed will be free in the near future. For example, in some embodiments the system may be able to monitor garbage collection processes and identify one or more AUs that are scheduled for garbage collection. These identified AUs may be added to the list of speculative AUs 608. In other embodiments, the system may be configured to predict that one or more AUs may be garbage collected in the near future and add these AUs to the list of speculative AUs 608 as well. Other methods of predicting and/or otherwise anticipating an AU may be soon freed are possible and are contemplated. Further, while the above discussion described unincorporated AUs 602, transitional AUs 604, free AUs 606, and speculative AUs 608, those skilled in the art will appreciated that AUs may have different states depending on the particular processes involved in moving from free to allocated, and vice-versa. In such embodiments, these AUs with other states may also be tracked and all such embodiments are contemplated.

Figure 7:
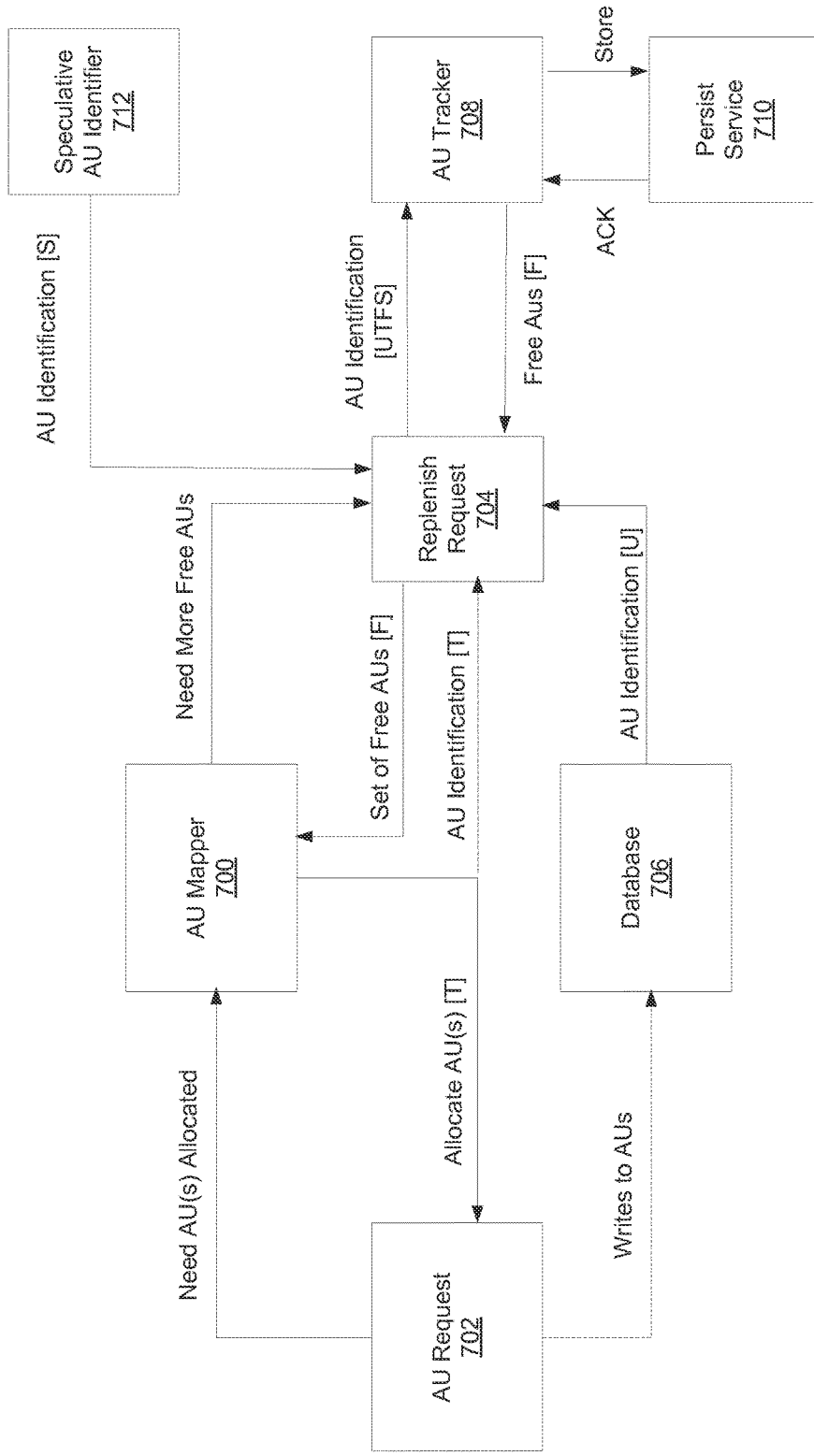
FIG. 7 illustrates one embodiment of processes that may be involved in the allocation of AUs and transition of AUs between different states.

Turning now to FIG. 7, one embodiment of processes used in managing AUs is shown. It is noted that while various processes are depicted, in various embodiments different processes may perform similar functions, some functions may be performed by other processes not depicted, and so on. In various embodiments, each of the blocks may correspond to a given process, particular program code, a hardware component, or otherwise. The illustrated embodiment is provided for purposes of discussion. In the embodiment shown, an AU request 702 process is shown that is configured to generate requests for allocation of AUs (Need AU(s) Allocated). Such requests may be generated responsive to received write requests, garbage collection processes, or otherwise. Responsive to such requests, an AU mapper 700 may allocate one or more AUs responsive to a request (Allocate AU(s)). These allocated AUs may generally correspond to transitional [T] AUs as discussed above. In addition to allocating such AUs, an identification of these allocated AUs may also be provided to replenish request process 704 (shown by the dashed line). This indication may explicitly or implicitly indicate these AUs correspond to AUs in a transitional [T] state. In various embodiments, AUs selected by mapper 700 are chosen from a reduced set of free AUs such as the free sublist discussed above. At various times, mapper 700 may request more AUs for use in servicing requests for allocation of AUs. For example, as discussed above in relation to the free sublist, when the free sublist reaches a particular threshold (e.g., some minimum number), the mapper 700 may request replenishment (Need more Free AUs) of its free sublist. As described above, whether and when a request for replenishment is generated may be programmable, may be dynamic based on various conditions, and so on as previously discussed. Responsive to this request, a replenish process 704 will provide identification of one or more free AUs (Set of Free AUs [F]) to the mapper 700. At this point in time, process 704 may identify these AUs as free [F] AUs.

In addition to the above, database 706 may at various times provide an identification of AUs that have been allocated and are in use (Allocated AUs) to process 704. Database 706 may generally correspond to an identification of AUs that have been allocated and are in use, but whose identification has not yet been persisted. Accordingly, these AUs identified by database 706 may generally correspond to the unincorporated [U] AUs discussed above. For example, request process 702 may provide an indication to database 706 when an AU that has been allocated is now is use (e.g., as indicated by the dashed arrow Writes to AUs). In other embodiments, this indication that an AU is in use and corresponds to an unincorporated AU may be provided by some other process or determined in some other way. It is noted that while FIG. 7 depicts an identification of various types of AUs being provided to request process 704, in various embodiments the identification of one or more of these AUs (or types of AUs) may be performed when recomputation of the AU management set is done. For example, at the time the AU management set is recomputed, a process (e.g., such as process 704, or process 708) may access data in memory and/or stored at one or more other locations to determine a state of various AUs in the system. In this manner, the AU management set is recomputed and may be persisted at that time.

Still further, in some embodiments AUs which are believed will become free are tracked or otherwise identified. For example, as discussed above, garbage collection processes may schedule AU for reclamation and this information may be accessible or determinable by a speculative AU identifier process 712 as shown in FIG. 7. Having identified such AUs, this identification of speculative AUs [S] may be provided or otherwise made available to process 704. In some embodiments, an identification of AUs corresponding to an unincorporated [U], free [F], transitional [T], and/or speculative [S] state may be provided or other made available to AU tracker 708. At various times, information corresponding to this AU management set may be persisted by storing (Store) the information on non-volatile storage. Responsive to such a store operation, an acknowledgement (ACK) may be provided to confirm the store has been successfully completed. In various embodiments, tracker 708 may be configured to store the information each time the AU management set is recomputed. In some embodiments, if a newly recomputed AU management list is determined to be a subset of a previously persisted AU management set, a store of the information may be bypassed or skipped (as it would duplicate previous information already stored).

Figure 8:
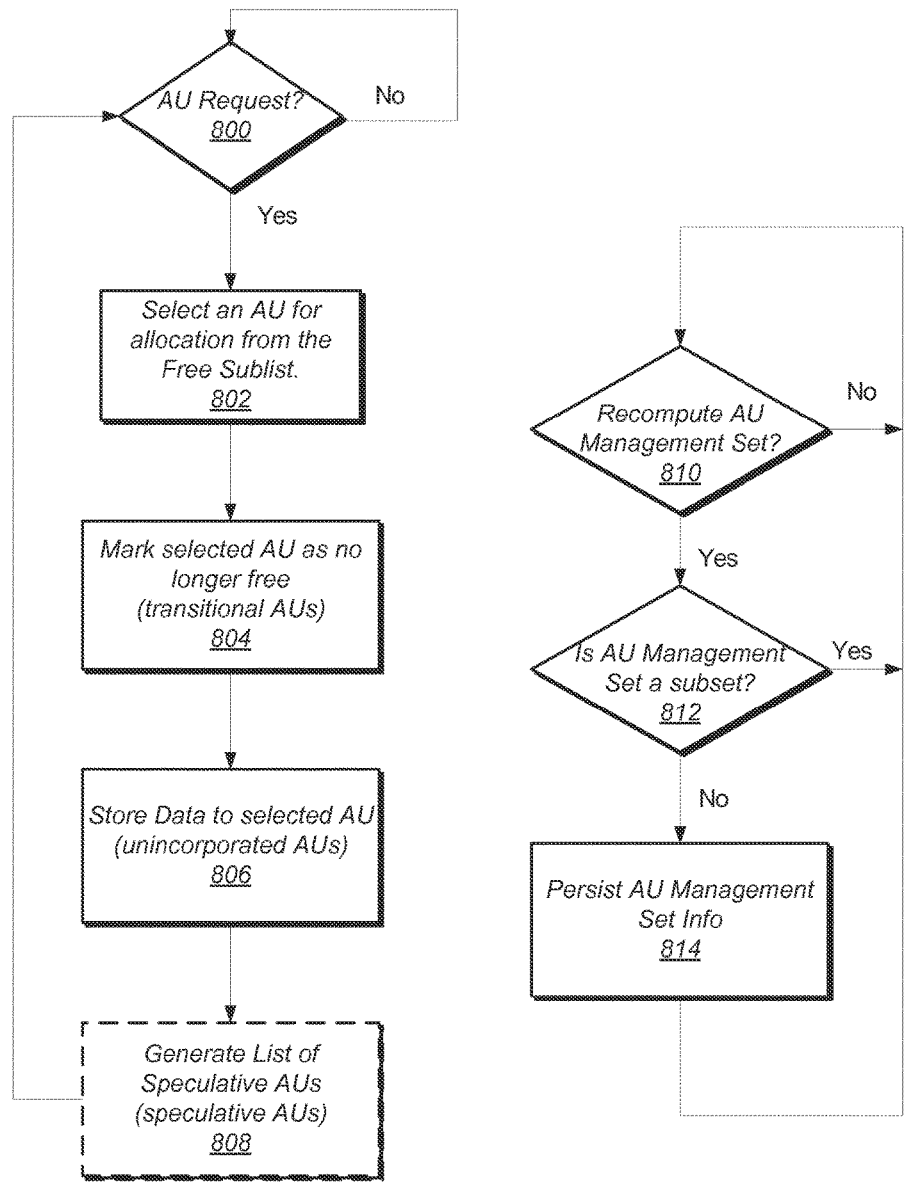
FIG. 8 illustrates one embodiment of a method for managing AUs in a system.

FIG. 8 illustrates one embodiment of a method for managing AUs. In the example shown, two flowcharts are depicted which may operate independent of one another. In other embodiments, events in one may trigger events in the other. As shown, a request for allocation of an AU may be detected (block 800). In response to the request, one or more AUs are selected for allocation from a reduced free list as discussed above (block 802). Responsive to selecting AUs for allocation from the reduced list, an indication may be stored to indicate the selected AUs are no longer available for allocation (block 804). The selected AUs which have been marked or are otherwise identified as such correspond to transitional AUs. Subsequently, the allocated AUs will in fact enter use and store data (block 806). At this time, the AU are no longer transitional AUs and are now identified as unincorporated AUs. In some embodiments, speculative AUs may be identified (block 808) as discussed above and an identification of these speculative AUs maintained. The identification of the reduced set of free AUs, transitional AUs, unincorporated AUs, and/or speculative AUs collectively form the AU management set.

In addition to the above, at various times the AU management set may be computed/recomputed as discussed above (block 810). If such a recomputation is performed, information corresponding to the AUs identified in the AU management set may be persisted (block 814). As noted, in some embodiments, if the newly computed AU management set is a subset of information already persisted, then the persisting step may be skipped.

Figure 9:
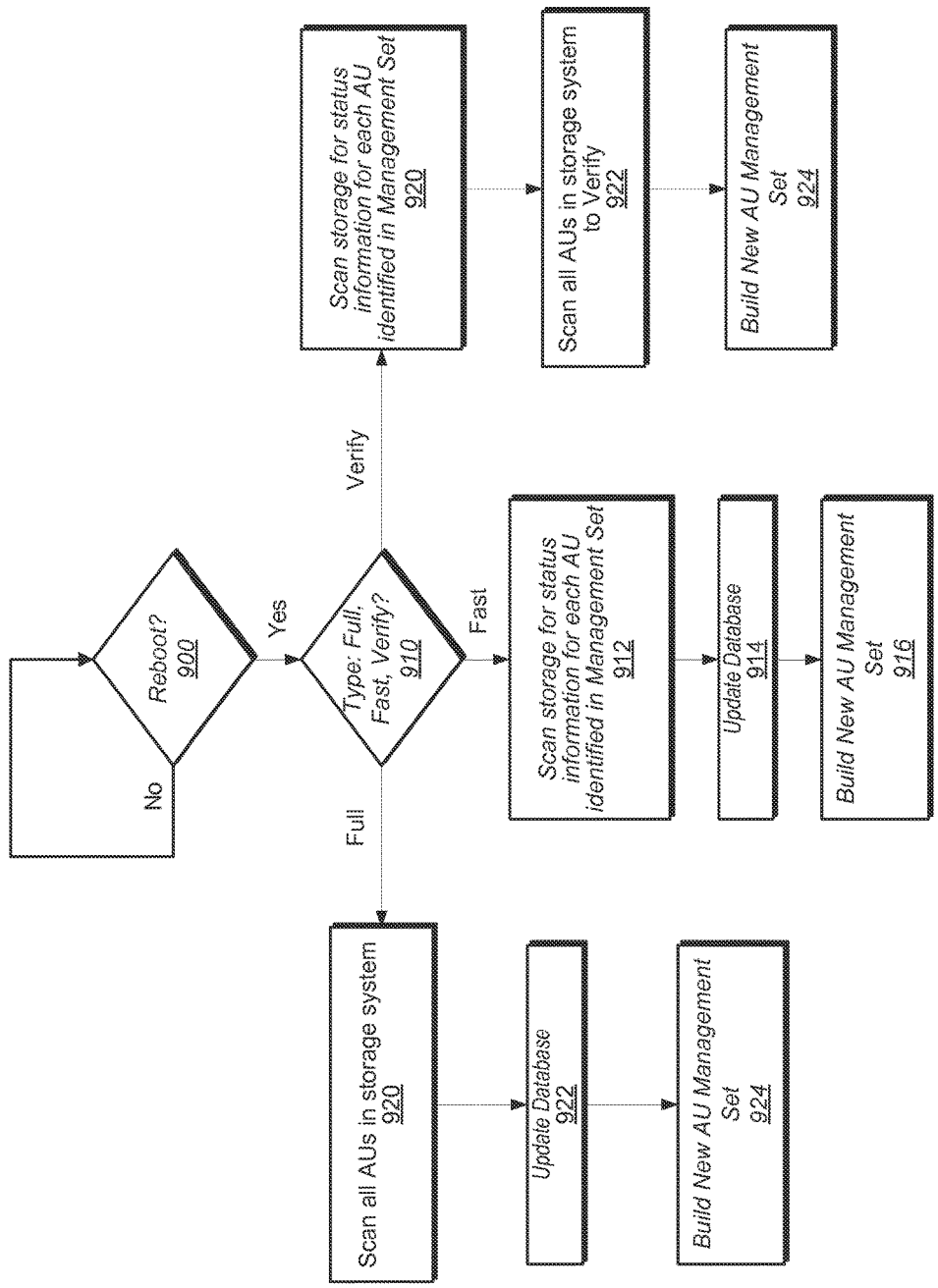
FIG. 9 illustrates one embodiment of a method for rebooting a storage system.

FIG. 9 depicts one embodiment of a method for rebooting (or simply booting) a storage system. In the example shown, responsive to a reboot (block 900) a determination may be made as to what type of reboot process is to be performed. In various embodiments, two or more types of reboot may be available. Selection of a type of reboot may be programmable in advance or selectable at the time of reboot (either explicitly or by default in the absence of a different selection). In one embodiment, three type of reboot are available: Full, Fast, and Verify. If a full reboot type is selected, then a scan of all AUs in the storage system may be performed to determine a state of AUs in the system. As described above, in various embodiments each AU stores information that may be used to identify information regarding the AU. In some embodiments, the first two pages of each AU contain such information and are scanned during the scanning process. These two pages may be referred to as the AU head. It is noted that such information need not be in the first two pages of the AU, rather the information may be stored elsewhere within a given AU or outside the AU in a determinable location. As already described, such information may include an indication as to whether the AU is allocated or not. Additionally, if allocated, the information may include an indication as to when the AU was allocated relative to other AUs (e.g., a monotonically increasing identifier, time stamp, or otherwise).

Having scanned all AUs in the storage system, AUs may be identified as allocated or free. As may be appreciated, some AUs may have been marked as defective or otherwise not usable. In such a case, they may essentially be removed from consideration. Based upon the information from the scan, a database may be updated to reflect identify (at least) the allocated AUs. This database may then be persisted. The remaining usable AUs may be identified as free. Subsequently, a new AU management set may be computed and processing may continue. Immediately subsequent to building the AU management set (block 924), the management set may only include a reduced free set of AUs as none have yet transitioned to a transitional or unincorporated state.

If the reboot type is determined to be of type Fast (block 910), then a process similar to that of FIG. 5 may be performed. However, in this case, rather than just scanning AUs that were persisted as being part of the free sublist, a scan of each AU persisted as part of the AU management set is performed (block 912). As noted that may include AUs including free AUs in the reduced free list, transitional AUs, unincorporated AUs, and speculative AUs. Various embodiments may not include all of these types. Upon scanning these AUs, it can be determined which are allocated and were allocated after a last allocated AU identified by a persisted database. This is similar to the steps 506 and 512 of FIG. 5. Based on this information, the database may be updated, a new AU management set created/computed, and processing may continue.

In the case where the reboot is of type Verify, the Fast reboot type is performed and a full scan is used to verify the correctness of the resulting database. As depicted in FIG. 9, AUs identified by the persisted AU management set (information) are scanned (block 920), then all AUs are scanned (block 922) as part of a verification process, and a new AU management set created/computed.

It is noted that each of the above described methods and mechanisms may be combined in various ways. In addition, in various embodiments the AU management set may be managed in such a way that it has a relatively fixed size. In other words, the AU management set may be "set" (e.g., programmed) to identify a given number of AUs. In this manner, a reboot using the Fast reboot type will require scan of a relatively consistent number of AUs. This in turn may provide a relatively consistent, and perhaps predictable, reboot time.

Given an embodiment where the AU management set is configured to maintain some particular number of AUs, various processes described above may be managed in a particular way. For example, each time the AU management set is recomputed, the number of free AUs to include as part of a reduced set of free AUs may depend on the number of other types of AUs. As an example, if the AU management set is programmed to maintain identification of an integer number N AUs, then on recomputation of the management set L AUs may be determined to be unincorporated, M AUs may be determined to be transitional, and P AUs may be determined to be speculative. In order to maintain the management set to a total of N AUs, the number X of free AUs to include as part of the reduced set is X=N−L−M−P. Therefore, in one example, when the AU management set is first created (at boot) it contains an identification of N free AUs (in some embodiments the initial set may include some number of speculative AUs which would then reduce the number of free AUs identified). During processing some portion of these AUs will change state to transitional or unincorporated. However, in various embodiments the total number of AUs identified does not change. At the time of recomputation of the AU management set, the number and type of each AU may change in the set, but the total number may remain fixed. In some embodiments, recomputation may result in a change in the total number of AUs identified in the AU management set. Such a change could be programmable or dynamically determined responsive to system conditions. These and other embodiments are possible and are contemplated.

Figure 10:
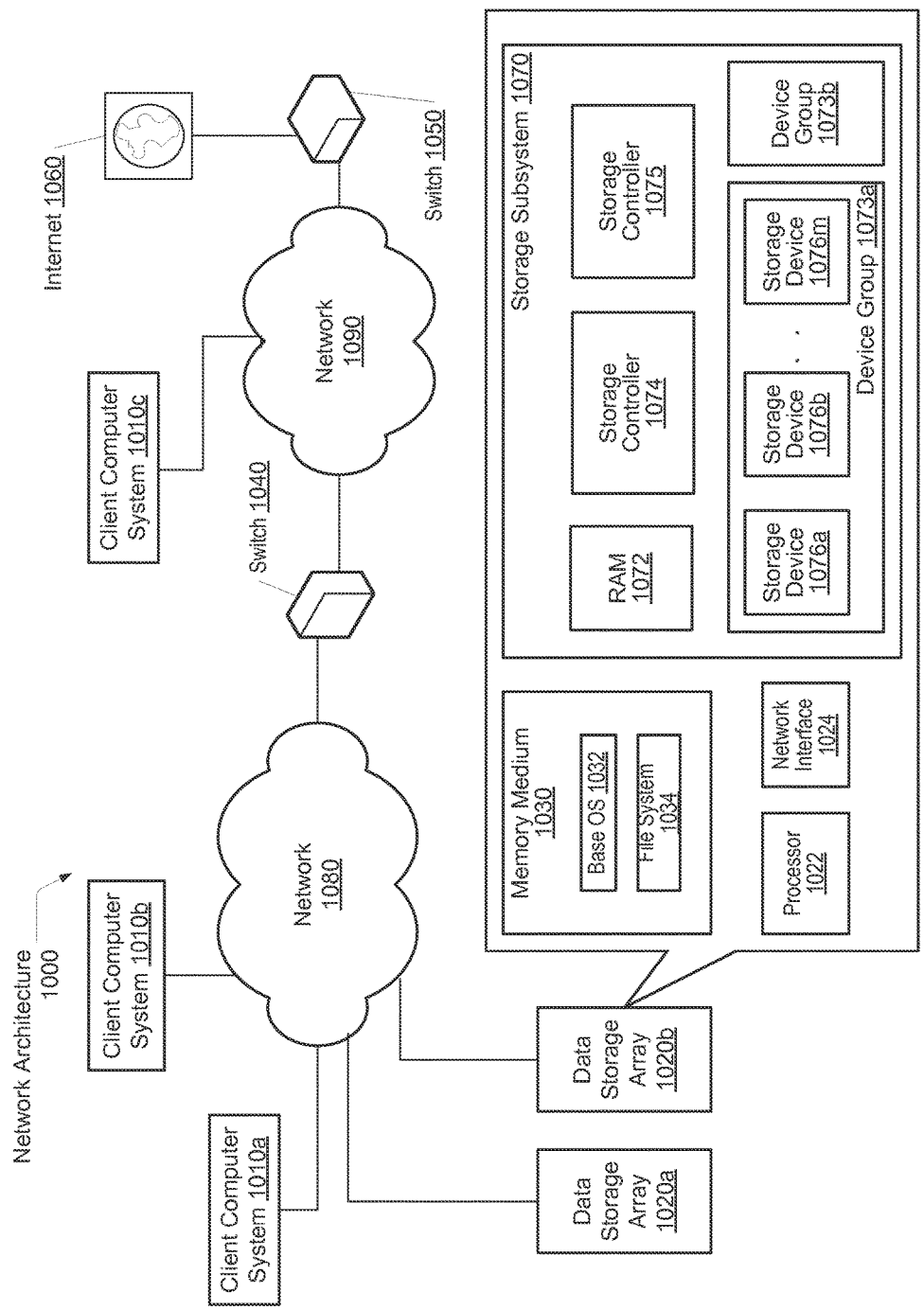
FIG. 10 is a generalized block diagram illustrating one embodiment of a network architecture.

Referring to FIG. 10, a generalized block diagram of one embodiment of a network and system that may incorporate the methods and mechanisms described above. In various embodiments, client computer systems 1010a-1010b are interconnected to one another through a network 1080 and to data storage arrays 1020a-1020b. Network 1080 may be coupled to a second network 1090 through a switch 1040. Client computer system 1010c is coupled to client computer systems 1010a-1010b and data storage arrays 1020a-1020b via network 1090. In addition, network 1090 may be coupled to the Internet 1060 or otherwise outside network through switch 1050.

In the network architecture 1000, each of the data storage arrays 1020a-1020b may be used for the sharing of data among different servers and computers, such as client computer systems 1010a-1010c. In addition, the data storage arrays 1020a-1020b may be used for disk mirroring, backup and restore, archival and retrieval of archived data, and data migration from one storage device to another. In an alternate embodiment, one or more client computer systems 1010a-

1010c may be linked to one another through fast local area networks (LANs) in order to form a cluster. Such clients may share a storage resource, such as a cluster shared volume residing within one of data storage arrays 1020a-1020b.

Each of the data storage arrays 1020a-1020b includes a storage subsystem 1070 for data storage. Storage subsystem 1070 may comprise one or more storage devices 1076a-1076m. These storage devices 1076a-1076m may provide data storage services to client computer systems 1010a-1010c. Each of the storage devices 1076a-1076m uses a particular technology and mechanism for performing data storage. The type of technology and mechanism used within each of the storage devices 1076a-1076m may at least in part be used to determine the algorithms used for controlling and scheduling read and write operations to and from each of the storage devices 1076a-1076m. For example, the algorithms may locate particular physical locations corresponding to the operations. In addition, the algorithms may perform input/output (I/O) redirection for the operations, removal of duplicate data in the storage subsystem 1070, and support one or more mapping tables used for address redirection and deduplication.

The logic used in the above algorithms may be included in one or more of a base operating system (OS) 1032, a volume manager 1034, within each of the storage subsystem controllers 1074 and 1075, control logic within each of the storage devices 1076a-1076m, or otherwise. Additionally, the logic, algorithms, and control mechanisms described herein may comprise hardware and/or software.

In some embodiments, each of the storage devices 1076a-1076m may include or be further coupled to storage consisting of solid-state memory to store persistent data. In one embodiment, the included solid-state memory comprises solid-state drive (SSD) technology. A Solid-State Disk (SSD) may also be referred to as a Solid-State Drive. Storage array efficiency may be improved by creating a storage virtualization layer between user storage and physical locations within storage devices 1076a-1076m. In one embodiment, a virtual layer of a volume manager is placed in a device-driver stack of an operating system (OS), rather than within storage devices or in a network. A volume manager or a disk array manager is used to support device groups 1073a-1073m.

The controllers 1074 and 1075 may comprise logic for handling received read/write requests. In some embodiments, each of the data storage arrays 1020a-1020b includes multiple controllers, such as controllers 1074 and 1075. For example, when the original controller 1074 fails, a failover process transfers control to the secondary controller 1075. The base OS 1032, the volume manager 1034 (or disk array manager 1034), any OS drivers (not shown) and other software stored in memory medium 1030 may provide functionality providing access to files and the management of these functionalities. The base OS 1032 and the OS drivers may comprise program instructions stored on the memory medium 1030 and executable by processor 122 to perform one or more memory access operations in storage subsystem 1070 that correspond to received requests. Each of the data storage arrays 1020a-1020b may use a network interface 124 to connect to network 1080. Similar to client computer systems 1010a-1010c, in one embodiment, the functionality of network interface 124 may be included on a network adapter card.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for identifying and accessing available memory blocks in a flash storage system, the apparatus configured to:
    build a management set that identifies a subset of the memory blocks of the free block list, one or more transitional memory blocks, one or more unincorporated memory blocks, and one or more speculative memory blocks;
    before shutdown of the flash storage system, generate a free block list of the memory blocks that are available on the flash storage system; and
    during bootup of the flash storage system:
        for each memory block on the free block list, determine if the memory block has been correctly listed as available or has been allocated; and
        identify all currently available memory blocks in dependence upon determining if the memory block has been correctly listed as available or has been allocated.

2. The apparatus as recited in claim 1, wherein the apparatus is further configured to:
    identify a given memory block identified as most recently allocated, wherein the given memory block identified as most recently allocated corresponds to a last memory block whose identification was stored to persistent storage before a bootup sequence; and
    identify all memory blocks allocated after the given memory block based on a search of the memory blocks of the free block list.

3. The apparatus as recited in claim 2, wherein the apparatus is configured to use an indication of allocated memory blocks stored in persistent storage with said one or more memory blocks allocated after the given memory block to identify all allocated memory blocks in the flash storage system and all available memory blocks in the flash storage system without a search of memory blocks other than the memory blocks of the free block list.

4. The apparatus as recited in claim 1, wherein the apparatus is further configured to store an indication of allocated memory blocks in the flash storage system responsive to detecting a condition.

5. The apparatus as recited in claim 1, wherein the apparatus is further configured to allocate only memory blocks from the memory blocks of the free block list.

6. The apparatus recited in claim 1, wherein the apparatus is further configured to store an identification of the memory blocks of the free block list to persistent memory responsive to detecting a condition.

7. A method for identifying and accessing available memory blocks in a flash storage system, the method comprising:
  building a management set that identifies a subset of the memory blocks of the free block list, one or more transitional memory blocks, one or more unincorporated memory blocks, and one or more speculative memory blocks;
  before shutdown of the flash storage system, generating a free block list of the memory blocks that are available on the flash storage system; and
  during bootup of the flash storage system:
    for each memory block on the free block list, determining if the memory block has been correctly listed as available or has been allocated; and
    identifying all currently available memory blocks in dependence upon determining if the memory block has been correctly listed as available or has been allocated.

8. The method as recited in claim 7, further comprising:
  identifying a given memory block identified as most recently allocated, wherein the given memory block identified as most recently allocated corresponds to a last memory block whose identification was stored to persistent storage before a bootup sequence; and
  identifying all memory blocks allocated after the given memory block based on a search of the memory blocks of the free block list.

9. The method as recited in claim 8, further comprising using an indication of allocated memory blocks stored in persistent storage with said one or more memory blocks allocated after the given memory block to identify all allocated memory blocks in the flash storage system and all available memory blocks in the flash storage system without a search of memory blocks other than the memory blocks of the free block list.

10. The method as recited in claim 7, further comprising storing an indication of allocated memory blocks in the flash storage system responsive to detecting a condition.

11. The method as recited in claim 7, further comprising allocating only memory blocks from the memory blocks of the free block list.

12. The method as recited in claim 7, further comprising storing an identification of the one or more free memory blocks to persistent memory responsive to detecting a condition.

13. A non-transitory computer readable storage medium for identifying and accessing available memory blocks in a flash storage system, the storage medium storing program instructions executable by a processor to:
  build a management set that identifies a subset of the memory blocks of the free block list, one or more transitional memory blocks, one or more unincorporated memory blocks, and one or more speculative memory blocks;
  before shutdown of the flash storage system, generate a free block list of the memory blocks that are available on the flash storage system; and
  during bootup of the flash storage system:
    for each memory block on the free block list, determine if the memory block has been correctly listed as available or has been allocated; and
    identify all currently available memory blocks in dependence upon determining if the memory block has been correctly listed as available or has been allocated.

14. The non-transitory computer readable storage medium as recited in claim 13, further comprising program instructions executable by the processor to:
  identify a given memory block identified as most recently allocated, wherein the given memory block identified as most recently allocated corresponds to a last memory block whose identification was stored to persistent storage before a bootup sequence; and
  identify all memory blocks allocated after the given memory block based on a search of the memory blocks of the free block list.

15. The non-transitory computer readable storage medium as recited in claim 13, wherein the program instructions are further executable to store an indication of allocated memory blocks in the flash storage system responsive to detecting a condition.

16. The non-transitory computer readable storage medium as recited in claim 15, wherein the program instructions are further executable to use an indication of allocated memory blocks stored in persistent storage with said one or more memory blocks allocated after the given memory block to identify all allocated memory blocks in the flash storage system and all available memory blocks in the flash storage system without a search of memory blocks other than the memory blocks of the free block list.

17. The non-transitory computer readable storage medium as recited in claim 13, wherein the instructions are further executable to allocate only memory blocks from the memory blocks of the free block list.

18. The non-transitory computer readable storage medium as recited in claim 13, wherein the instructions are further executable to store an identification of the memory blocks of the free block list to persistent memory responsive to detecting a condition.

* * * * *